United States Patent
Narita

(10) Patent No.: US 9,555,590 B2
(45) Date of Patent: Jan. 31, 2017

(54) PNEUMATIC TIRE FOR HEAVY LOAD, AND METHOD FOR PRODUCING THE SAME

(71) Applicant: TOYO TIRE & RUBBER CO., LTD., Osaka-shi, Osaka (JP)

(72) Inventor: Hiroaki Narita, Osaka (JP)

(73) Assignee: TOYO TIRE & RUBBER CO., LTD., Osaka (JP)

(*) Notice: Subject to any disclaimer, the term of this patent is extended or adjusted under 35 U.S.C. 154(b) by 273 days.

(21) Appl. No.: 14/148,111

(22) Filed: Jan. 6, 2014

(65) Prior Publication Data

US 2014/0332143 A1   Nov. 13, 2014

(30) Foreign Application Priority Data

May 7, 2013   (JP) .................................. 2013-097386

(51) Int. Cl.
    *B29D 30/06*   (2006.01)
(52) U.S. Cl.
    CPC ... *B29D 30/0662* (2013.01); *B29D 2030/0677* (2013.01)
(58) Field of Classification Search
    None
    See application file for complete search history.

(56) References Cited

U.S. PATENT DOCUMENTS

| 4,044,600 A | * | 8/1977 | Claxton | .............. B29C 35/0288 |
| | | | | 264/236 |
| 2011/0180958 A1 | * | 7/2011 | Goumault | ............... B29C 33/04 |
| | | | | 264/236 |
| 2013/0284336 A1 | | 10/2013 | Kaneda | |
| 2014/0144563 A1 | * | 5/2014 | Narita | ....................... B60C 5/00 |
| | | | | 152/450 |

FOREIGN PATENT DOCUMENTS

| JP | 4788230 B2 | 10/2011 |
| TW | 201302415 A | 1/2013 |

OTHER PUBLICATIONS

Office Action dated Nov. 18, 2016, issued in counterpart Chinese Patent Application No. 201410187590.3, with English translation. (22 pages).

* cited by examiner

*Primary Examiner* — Monica Huson
(74) *Attorney, Agent, or Firm* — Westerman, Hattori, Daniels & Adrian, LLP

(57) ABSTRACT

In the method according to the invention for producing a pneumatic tire for heavy load, it is important that the following vulcanizing conditions are satisfied, the temperature for vulcanizing the tread region is 140° C. or lower, a vulcanization calorie given to the bead regions is a calorie corresponding to a time of 25 to 40 minutes in terms of the vulcanization calorie at a vulcanizing temperature of 140° C., and the ratio of a vulcanization calorie given to the front surface of the tread region to the vulcanization calorie given to the bead regions is 0.6 or more and less than 1.0, these vulcanization calories being each in terms of the vulcanization calorie at the vulcanizing temperature of 140° C.

2 Claims, 1 Drawing Sheet

PNEUMATIC TIRE FOR HEAVY LOAD, AND METHOD FOR PRODUCING THE SAME

BACKGROUND OF THE INVENTION

Field of the Invention

The present invention relates to a method for producing a pneumatic tire for heavy load, the method including a vulcanizing step of: putting, into a mold, an unvulcanized raw tire having a pair of bead regions, a side wall region extended from each of the bead regions outward along the tire diameter direction, and a tread region connected to an outside end in the tire diameter direction of each of the side wall regions, the tread region constituting a tread of the tire; and then heating and vulcanizing the raw tire while a bladder inside the raw tire is expanded to put and press the raw tire onto the inner surface of the mold.

Description of the Related Art

In pneumatic tires for heavy load, which are used in trucks, buses, vehicles for construction, and the like, their sites where trouble is caused are typically their tread region and bead regions. A method for improving these regions in endurance is, for example, a method of adding a reinforcing member to desired positions thereof, or a method of contriving the shape thereof. However, such a method may result in an undesired increase in the mass or in costs, or the like.

In order to prevent local overcure of a tire casing-region including an inner liner layer or a carcass layer to improve the tire in endurance, Patent Document 1 below describes a method for producing a pneumatic tire in which regarding respective highest reach-temperatures of individual positions in the thickness direction of a crown region of a tire while the region is being vulcanized, the difference between a maximum value and a minimum value of the temperatures is set to 10° C. or lower, and further regarding respective equivalent vulcanization degrees of the individual positions in the thickness direction of the tire crown region, the ratio of a maximum value of the degrees to a minimum value thereof is set to 1.6 or lower.

PRIOR ART DOCUMENT

Patent Document

Patent Document 1: Japanese Patent No. 4788230

SUMMARY OF THE INVENTION

Although the producing method described in the prior art document produces an effect of improving a tread rubber of the tire or the like in endurance, the method has the following problem since attention is not paid to the endurance of bead regions of the tire, so that the endurance of the bead regions tends to be deteriorated, as will be demonstrated by the results of Examples described later.

As described above, in particular pneumatic tires for heavy load, it is difficult under the actual circumstances to improve the endurance of their bead regions while that of their tread region is ensured. In light of the actual circumstances, the present invention has been achieved. An object thereof is to optimize vulcanizing conditions of a raw tire, thereby providing a pneumatic tire for heavy load in which the endurance of bead regions is improved while that of a tread region is ensured, and a method for producing the tire.

The present inventor has made eager investigations to find out that the problem can be solved by adjusting the following (1) to (3) inseparably from each other: (1) the temperature for vulcanizing a tread region of a tire; (2) a vulcanization calorie given to bead regions thereof; and (3) the ratio between a vulcanization calorie given to the front surface of the tread region and the vulcanization calorie given to the bead regions. The present invention has been made based on this finding, and is as follows.

Accordingly, the method of the present invention for producing a pneumatic tire for heavy load includes a vulcanizing step of: putting, into a mold, an unvulcanized raw tire comprising a pair of bead regions, a side wall region extended from each of the bead regions outward along the tire diameter direction, and a tread region connected to an outside end in the tire diameter direction of each of the side wall regions, the tread region constituting a tread of the tire; and heating and vulcanizing the raw tire while a bladder inside the raw tire is expanded to put and press the raw tire onto the inner surface of the mold;

wherein the following vulcanizing conditions are satisfied by adjusting at least a first heat source for heating the mold at a position corresponding to the tread region, a second heat source for heating the mold at a position corresponding to the side wall regions, and a supplying condition for supplying a medium to be supplied into the bladder:

(1) the temperature for vulcanizing the tread region is 140° C. or lower;

(2) a vulcanization calorie given to the bead regions is a calorie corresponding to a time of 25 to 40 minutes in terms of the vulcanization calorie at a vulcanizing temperature of 140° C.; and (3) the ratio of a vulcanization calorie given to the front surface of the tread region to the vulcanization calorie given to the bead regions is 0.6 or more and less than 1.0, these vulcanization calories being each in terms of the vulcanization calorie at the vulcanizing temperature of 140° C.

In the present invention, (1) the temperature for vulcanizing the tread region is 140° C. or lower. This makes it possible to prevent overcure of the tread region, so that the tread region can ensure endurance. Moreover, (2) the vulcanization calorie given to the bead regions is a calorie corresponding to a time of 25 to 40 minutes in terms of the vulcanization calorie at a vulcanizing temperature of 140° C. This makes it possible to improve the endurance of the bead regions. The vulcanization calorie in terms of the vulcanization calorie at a standard temperature, that is, the calorie corresponding to a period (minutes) in terms of the vulcanization calorie at the standard temperature can be introduced by a method that will be described below, the method being a method for calculating equivalent vulcanization quantity.

The equivalent vulcanization quantity is an integrated value of vulcanizing times (to) each calculated out in accordance with a vulcanization reaction rate equation described below based on the Van't Hoff's law. In the equation, T represents an actual vulcanizing temperature (° C.); t represents the vulcanizing time (minutes) at the vulcanizing temperature T; (To) represents a standard temperature (° C.); (to) represents the vulcanizing time (minutes) at the standard temperature (To); and a represents a vulcanizing temperature coefficient (the proportion of a change in the vulcanizing speed when the vulcanizing temperature is varied by 10° C.). As the standard temperature (To), 140° C. is adopted. As the vulcanizing temperature coefficient α, 2 or a value closed thereto is adopted at will. For simplification, α=2 is adopted in the invention.

$$to = t \times \alpha^{(T-TO)/10} \qquad (A)$$

In the equation (A), $\alpha^{(T-TO)/10}$ is an equivalent coefficient at a measuring temperature t, and corresponds to the calorie at the actual vulcanizing temperature T. If the equivalent coefficient at the time $t_1$ (minutes) and that at the time $t_2$ (minutes) are represented by x and y, respectively, a vulcanization calorie z (minutes) given in the period from $t_1$ to $t_2$, this value z being calculated out in terms of the vulcanization calorie at the standard temperature (To), is calculated out based on a trapezoidal area method in accordance with the following equation:

$$z=(x+y)\times(t_2-t_1)/2 \quad (B)$$

With respect to the condition (2), if the vulcanization calorie given to the bead regions is less than 25 minutes in terms of the vulcanization calorie at the vulcanizing temperature of 140° C., the bead regions undergo undercure so that the raw tire does not make use of the blend rubber sufficiently. Contrarily, if the vulcanization calorie given to the bead regions is more than 40 minutes in terms of the vulcanization calorie at the vulcanizing temperature of 140° C., a deterioration of the bead regions is promoted so that the endurance of the bead regions is deteriorated.

The present invention is characterized in that the condition (3) is satisfied together with the conditions (1) and (2), that is, the conditions (1) to (3) are inseparably satisfied. This makes it possible that in the method according to the present invention for producing a pneumatic tire for heavy load, an improvement is made in balance between calories given to its tread region and to its bead regions. As a result, a pneumatic tire for heavy load can be produced in which the endurance of the whole of the tire is improved with a good balance. If the ratio of the vulcanization calorie given to the front surface of the tread region to that given to the bead regions is 1.0 or more, the calorie given to the tread region becomes excessive so that the tread region is deteriorated in endurance. Contrarily, if the ratio of the vulcanization calorie given to the front surface of the tread region to that given to the bead regions is less than 0.6, the calorie given to the bead regions becomes excessive so that the bead regions are deteriorated in endurance.

In the method according to the present invention for producing a pneumatic tire for heavy load, for attaining the above-mentioned vulcanizing conditions, it is preferred that the temperature of the first heat source is set into the range of 130 to 140° C. and that of the second heat source is set into the range of 130 to 140° C. These temperatures are more preferably set into the range of 130 to 135° C. By adjusting each of the set temperatures of the first and second heat sources into the range, the vulcanizing conditions (1) to (3) can be effectively and certainly satisfied.

The pneumatic tire for heavy load according to the invention is a pneumatic tire produced by the producing method of the present invention. Thus, while the endurance of its tread region is ensured, that of its bead regions is also excellent.

DETAILED DESCRIPTION OF THE PREFERRED EMBODIMENTS

Figure 1:
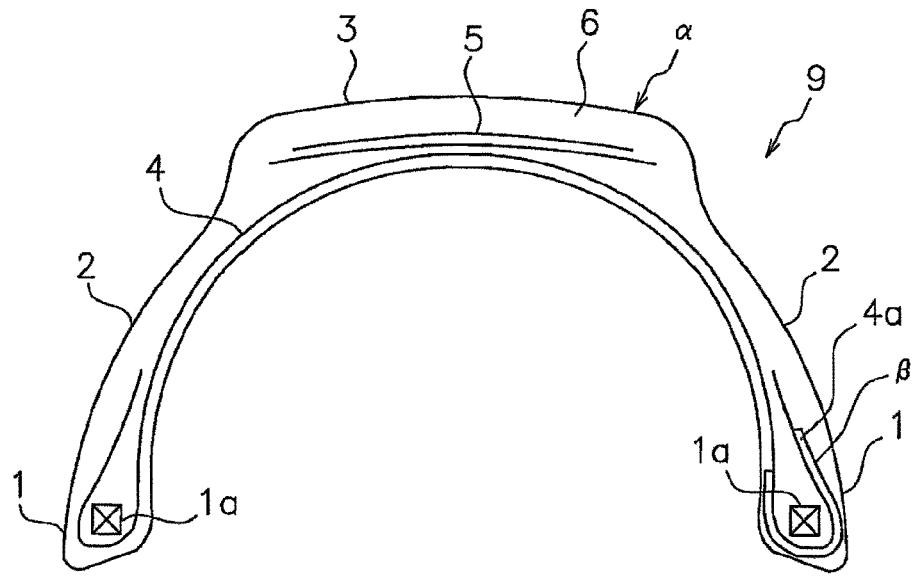
FIG. 1 is a sectional view of an example of the tire according to the present invention along a meridian of the tire.

Hereinafter, embodiments of the present invention will be described with reference to the drawings. A tire 9 illustrated in FIG. 1 is a pneumatic tire having a pair of bead regions 1, a side wall region 2 extended from each of the bead regions 1 outward along the tire diameter direction, and a tread region 3 connected to an outside end in the tire diameter direction of each of the side wall regions 2, this tread region constituting a tread of the tire. A ring-form bead core 1a is arranged in each of the bead regions 1.

A carcass layer 4 is extended from the tread region 3 through the side wall regions 2 to the bead regions 1, and then its ends are turned around the bead cores 1a. The carcass layer 4 is made of at least one carcass ply. The carcass play is formed of a carcass cord extended at an angle of about 90° to the circumferential direction of the tire and coated with a topping rubber. A chafer 4a is arranged inside one of the bead cores 1a in the tire diameter direction and across the carcass layer 4 over the bead core 1a.

In the tread region 3, a belt layer 5 is bonded to the outside of the carcass layer 4, and is covered with a tread rubber 6 from the outside of the belt layer 5. The belt layer 5 is composed of plural belt plies (two belt plies in the present embodiment). Each of the belt plies is formed of a belt cord extended to be inclined to the circumferential direction of the tire and coated with a topping rubber. The belt cords are laminated onto each other so as to cross each other into directions reverse to each other between the plies.

The tread rubber 6 may be made of only a single layer, or made to have the so-called cap-base structure, which has a base tread arranged at the inside of the tire in the tire diameter direction and a cap tread positioned at the outside of the base tread.

The tire 9 illustrated in FIG. 1 is a raw tire, which is in an unvulcanized state, and is to be shaped into the shape of a product tire in a vulcanizing step described later (see FIG. 2). Together with the shaping, a tread pattern that may be of various types is formed in the front surface of the tread.

Figure 2:
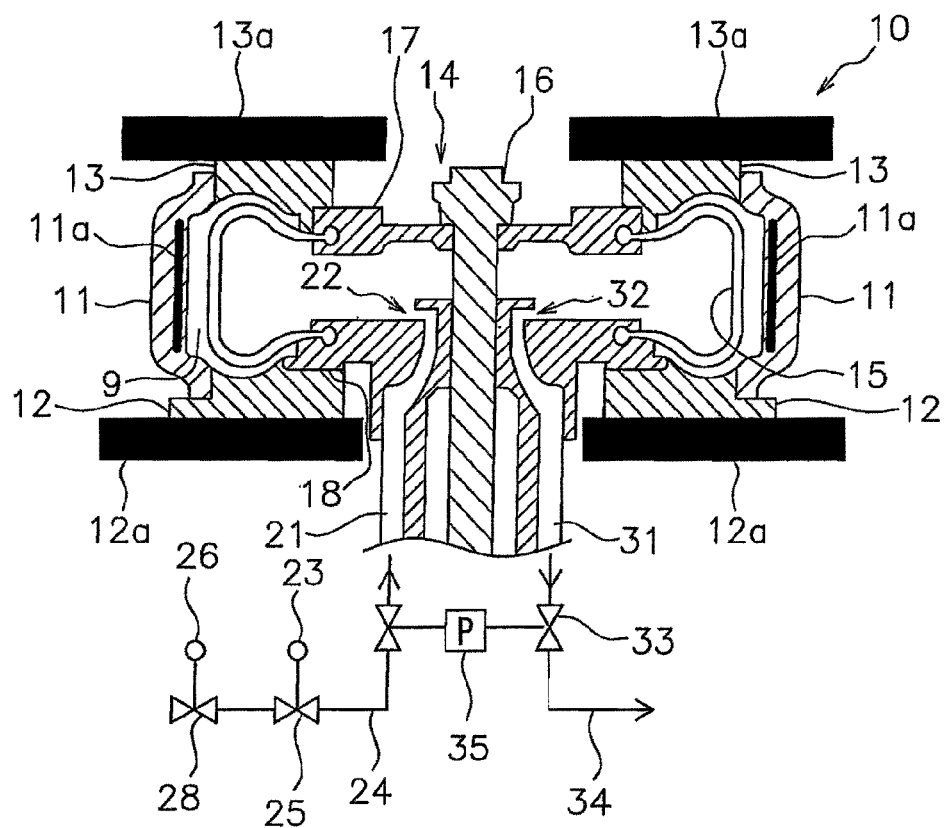
FIG. 2 is a sectional view which schematically illustrates a mold used for vulcanizing a tire.

For vulcanizing the tire 9 into the product shape, a mold 10 as illustrated in FIG. 2 is used. The tire 9, which is in an unvulcanized state, is set into this mold 10, and the tire 9 inside the mold 10 is heated and pressed to be vulcanized.

The mold 10 has a tread mold part 11 which is to contact with the tread of the tire 9, a lower mold part 12 which is to contact with an outer surface of the tire that is faced downward, and an upper mold part 13 which is to contact with an outer surface of the tire that is faced upward. These parts are formed to be freely shifted between a mold-closed state and a mold-open state by means of an opening/closing mechanism (not illustrated) arranged around the parts. The structure of this opening/closing mechanism is well known. A platen plate having heat sources, such as electric heaters or steam jackets, are fitted to the mold 10. This plate performs heating of the respective mold parts. In the present invention, the mold 10 is heated by a first heat source 11a arranged at a position corresponding to the tread region 3 to heat the tread mold part 11; and second sources 12a and 13a arranged at positions corresponding to the side wall regions 2 to heat the upper mold part 13 and the lower mold part 12, respectively. In this way, the tire 9 is heated and vulcanized.

A central mechanism 14 is fitted into the center of the mold 10 to be concentric with the axis of the tire. Around this mechanism, the tread mold part 11, the lower mold part 12 and the upper mold part 13 are set. The central mechanism 14 has a bladder 15 in a rubber bag form, and a center post 16 extending along the axial direction of the tire. The center post 16 has an upper clamp 17 and a lower clamp 18 for grasping the end of the bladder 15.

In the central mechanism 14, a medium supplying path 21 is formed to be extended upward and downward in order to supply a heating medium into the bladder 15. At the upper end of the medium supplying path 21, a jetting-out opening 22 is formed. To the medium supplying path 21 is connected a supplying pipe 24 in which the following flows: the heating medium supplied from a heating medium supplying source 23, or a pressuring medium supplied from a pressuring medium supplying source 26. The heating medium is supplied in accordance with an opening/closing operation of a valve 25, and the pressuring medium is supplied in accordance with an opening/closing operation of a valve 28.

In the central mechanism 14, a medium discharging path 31 is extended upward and downward in order to discharge a high-temperature and high-pressure fluid, in which the heating medium and the pressuring medium are mixed with each other, in the bladder 15. A collecting opening 32 is formed in the upper end of the medium discharging path 31. To the medium discharging path 31 is connected a discharging pipe 34 in which the high-temperature and high-pressure fluid flows. A blow valve 33 for operating the opening and closing of this discharging pipe 34 is fitted to this pipe. A pump 35 may be an approach of circulating the high-temperature and high-pressure fluid forcibly in such a manner that the high-temperature and high-pressure fluid passing through the medium discharging path 31 is again supplied to the inside of the bladder 15 via the medium supplying path 21.

The following will describe a procedure that the mold 10 is used to vulcanize the tire 9 into the product shape. As illustrated in FIG. 2, the tire 9 is initially set into the mold 10, and then the tire 9 is shaped into a shape close to the inner surface shape of the mold 10 by the effect of the bladder 15, which is being expanded. By this operation, the tire 9 is held by the bladder 15, and put onto each of the tread mold part 11, the lower mold part 12 and the upper mold part 13.

Subsequently, at least the first heat source, and the second heat sources are used to conduct a heating step of: heating the mold 10 to attain outside-heating of heating the tire 9 from the tire outer surface side thereof; and supplying a high-temperature heating medium into the bladder 15 inside the mold 10 to attain inside-heating of heating the tire 9 from the tire inner surface side.

The mold 10 is beforehand heated by means of, for example, the above-mentioned steam jackets. In this way, the outside-heating is attained. The inside-heating is attained by supplying a heating medium through the medium supplying path 21 into the bladder 15 after the shaping of the tire 9 into the product shape. After the supply of the heating medium over a predetermined period, a pressuring medium is supplied into the bladder 15 to pressure the tire 9 at high pressure. The heating medium may be, for example, steam or high-temperature water. The pressuring medium may be, for example, an inert gas such as nitrogen gas, or steam.

In the method according to the invention for producing a pneumatic tire for heavy load, it is important that the following vulcanizing conditions are satisfied:

(1) the temperature for vulcanizing the tread region is 140° C. or lower;

(2) a vulcanization calorie given to the bead regions is a calorie corresponding to a time of 25 to 40 minutes in terms of the vulcanization calorie at a vulcanizing temperature of 140° C.; and (3) the ratio of a vulcanization calorie given to the front surface of the tread region to the vulcanization calorie given to the bead regions is 0.6 or more and less than 1.0, these vulcanization calories being each in terms of the vulcanization calorie at the vulcanizing temperature of 140° C.

In order to satisfy the vulcanizing conditions (1) to (3) effectively with certainty, the temperature of the first heat source and that of the second heat source are preferably set into the range of 100 to 140° C. and the range of 120 to 140° C., respectively, and more preferably set into the range of 130 to 140° C. and the range of 130 to 140° C., respectively. Even more preferably, the temperature of the second heat source is set into the range of 135 to 140° C.

In order to satisfy the vulcanizing conditions (1) to (3) more effectively with higher certainty, conditions for supplying the medium into the bladder may be contrived. Specifically, for example, the tire 9 is put into the mold 10, and then steam having a pressure of 1.1 to 1.6 MPa is introduced into the bladder 15 for 5 to 10 minutes, and preferably 5 to 8 minutes. Next, at normal temperature, an inert gas (such as nitrogen gas) having a pressure of 2.0 to 2.4 MPa is introduced thereinto for 30 to 65 minutes. As a result, the bladder 15 is filled with a mixed gas of the steam and the inert gas, and the temperature of the inside of the bladder 15 becomes 140 to 175° C. Alternately, instead of the inert gas, hot water having a pressure of 1.8 to 2.4 MPa may be introduced thereinto for 30 to 65 minutes.

By adjusting the respective temperatures of the first and second heat sources and the conditions for supplying the medium into the bladder, the vulcanizing temperature for the tread region is set to 140° C. or lower. It is preferred to set the temperature of the bead regions to 140° C. or lower. When the stability of the quality of the vulcanized tire is considered, it is preferred to set the highest value of the vulcanizing temperature for the tread region and that of the vulcanizing temperature for the bead regions during vulcanization to within ±5° C. of the respective set temperature-values of the first and second heat sources.

The pneumatic tire for heavy load according to the present invention is produced in the state that the vulcanizing conditions are optimized as described above; thus, while the endurance of its tread region is ensured, that of its bead regions is also excellent.

The present invention is not limited to the above-mentioned embodiments at all. The embodiments may be variously modified or altered within the scope of the invention.

Examples

Examples 1-7, and Comparative Examples 1-3

In order to demonstrate the constitutions and advantageous effects of the present invention specifically, the vulcanizing mold 10 illustrated in FIG. 2 was used to vulcanize a pneumatic tire for heavy load (tire size: 275/70 R 22.5). In each of Examples and Comparative Examples, at the time of heating and pressuring the tire 9 inside the mold 10, the respective temperatures of the first and second heat sources, and conditions for supplying the medium into the bladder were adjusted to satisfy vulcanizing conditions described in Table 1.

As illustrated in FIG. 1, at the time of measuring vulcanization calories, a thermocouple wire was embedded into each of the front surface α of the tread of the tire 9 and the inside (chafer 4a end) β of one of the beads to measure the vulcanizing temperature for the tread region 3 and that for the bead regions 1. In this way, the vulcanizing temperatures were measured. The results are shown in Table 1. In Table 1, the wording "Calorie ratio" denotes the "ratio of the vulcanization calorie given to the front surface of the tread region to that given to the bead regions".

In order to evaluate the endurance of the test tire, the tire was fitted to a wheel having a rim size of 22.5×8.25, and the air pressure therein was adjusted to 900 kPa. The tire was subjected to a running test on a drum (drum inside diameter: 1700 mm) at a speed of 40 km/hour under a load of 3150 kg. In the test, a measurement was made about the running distance up to a time when the tire broke down. As the numerical value of the distance is larger, the tire is excellent in endurance. The results are shown in Table 1.

TABLE 1

|  |  |  | Example 1 | Example 2 | Example 3 | Example 4 | Example 5 | Example 6 | Example 7 | Comparative Example 1 | Comparative Example 2 | Comparative Example 3 |
|---|---|---|---|---|---|---|---|---|---|---|---|---|
| Mold temperature | First heat source | °C. | 140 | 140 | 140 | 140 | 140 | 130 | 135 | 150 | 150 | 150 |
|  | Second heat source | °C. | 140 | 140 | 140 | 130 | 135 | 130 | 135 | 150 | 135 | 130 |
| Conditions for supplying medium into bladder | STEP 1 Saturated steam | MPa | 1.6 | 1.6 | 1.6 | 1.6 | 1.6 | 1.6 | 1.6 | 1.6 | 1.6 | 1.6 |
|  | Introducing period | minutes | 5 | 6 | 5 | 7 | 6 | 5 | 5 | 8 | 7 | 7 |
|  | STEP 2 Nitrogen gas | MPa | 2.2 | 2.2 | 2.2 | 2.2 | 2.2 | 2.2 | 2.2 | 2.2 | 2.2 | 2.2 |
|  | Period | minutes | 47 | 47 | 45 | 48 | 48 | 65 | 60 | 30 | 30 | 30 |
| Vulcanizing condition (1): tread region vulcanizing temperature (° C.) |  |  | 140 | 140 | 140 | 140 | 140 | 130 | 135 | 150 | 150 | 150 |
| Vulcanizing condition (2): bead region vulcanization calorie (minutes) |  |  | 30 | 35 | 30 | 30 | 28 | 30 | 28 | 50 | 41 | 42 |
| Vulcanizing condition (3): calorie ratio |  |  | 0.9 | 0.9 | 0.7 | 0.8 | 0.85 | 0.9 | 0.8 | 1.0 | 1.2 | 1.4 |
| Endurance |  |  | 118 | 120 | 126 | 127 | 121 | 113 | 123 | 100 | 92 | 87 |

From the results in Table 1, it is understood about the respective pneumatic tires produced by the producing methods according to Examples 1 to 7 that their tread region and their bead regions were each improved in endurance so that the tires were able to be prevented from being broken down. On the other hand, it is understood about the respective pneumatic tires produced by the producing methods according to Comparative Examples 1 to 3 that the set temperature of their first source and/or that of their second heat source was/were high so that the vulcanizing temperature for their tread regions was higher than 140° C. As a result, the pneumatic tires were deteriorated in endurance.

What is claimed is:

1. A method for producing a pneumatic tire for heavy load, comprising a vulcanizing step of: putting, into a mold, an unvulcanized raw tire comprising a pair of bead regions, a side wall region extended from each of the bead regions outward along the tire diameter direction, and a tread region connected to an outside end in the tire diameter direction of each of the side wall regions, the tread region constituting a tread of the tire; and heating and vulcanizing the raw tire while a bladder inside the raw tire is expanded to put and press the raw tire onto the inner surface of the mold;

wherein the following vulcanizing conditions are satisfied by adjusting at least a first heat source for heating the mold at a position corresponding to the tread region, a second heat source for heating the mold at a position corresponding to the side wall regions, and a supplying condition for supplying a medium to be supplied into the bladder:

(1) the temperature for vulcanizing the tread region is 140° C. or lower;

(2) a vulcanization calorie given to the bead regions is a calorie corresponding to a time of 25 to 40 minutes in terms of the vulcanization calorie at a vulcanizing temperature of 140° C.; and (3) the ratio of a vulcanization calorie given to the front surface of the tread region to the vulcanization calorie given to the bead regions is 0.6 or more and less than 1.0, these vulcanization calories being each in terms of the vulcanization calorie at the vulcanizing temperature of 140° C.

2. The method for producing a pneumatic tire for heavy load according to claim 1, wherein the temperature of the first heat source is set into the range of 130 to 140° C. and that of the second heat source is set into the range of 130 to 140° C. in order to attain the vulcanizing conditions.

* * * * *